US012620177B2

(12) United States Patent
Richter et al.

(10) Patent No.: US 12,620,177 B2
(45) Date of Patent: May 5, 2026

(54) METHOD AND DEVICE FOR GENERATING A SYNTHESIZED REALITY RECONSTRUCTION OF FLAT VIDEO CONTENT

(71) Applicant: Apple Inc., Cupertino, CA (US)

(72) Inventors: Ian M. Richter, Los Angeles, CA (US); Daniel Ulbricht, Sunnyvale, CA (US); Jean-Daniel E. Nahmias, San Francisco, CA (US); Omar Elafifi, Oakland, CA (US); Peter Meier, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 136 days.

(21) Appl. No.: 17/862,301

(22) Filed: Jul. 11, 2022

(65) Prior Publication Data

US 2024/0013487 A1 Jan. 11, 2024

Related U.S. Application Data

(63) Continuation of application No. 16/961,835, filed as application No. PCT/US2019/014260 on Jan. 18, 2019, now Pat. No. 11,386,653.

(Continued)

(51) Int. Cl.
*G06T 19/00* (2011.01)
*G06V 20/40* (2022.01)

(52) U.S. Cl.
CPC .............. *G06T 19/00* (2013.01); *G06V 20/41* (2022.01)

(58) Field of Classification Search
CPC ........ G06T 19/00; G06V 40/10; G06V 20/20; G06V 20/41; G06F 3/011
See application file for complete search history.

(56) References Cited

U.S. PATENT DOCUMENTS

| | | | |
|---|---|---|---|
| 6,195,090 B1 * | 2/2001 | Riggins, III | ....... H04N 21/8106 |
| | | | 348/478 |
| 7,199,798 B1 | 4/2007 | Echigo et al. | |

(Continued)

FOREIGN PATENT DOCUMENTS

| | | |
|---|---|---|
| CN | 1338089 A | 2/2002 |
| CN | 101593349 A | 12/2009 |

(Continued)

OTHER PUBLICATIONS

Notice to Grant for corresponding Chinese Application No. 2019800086751 dated Aug. 22, 2022 (Translation of Search Report).

(Continued)

*Primary Examiner* — Phi Hoang
(74) *Attorney, Agent, or Firm* — Fernando & Partners, LLP

(57) ABSTRACT

In one implementation, a method includes: identifying a plurality of plot-effectuators and a plurality of environmental elements within a scene associated with a portion of video content; determining one or more spatial relationships between the plurality of plot-effectuators and the plurality of environmental elements within the scene; synthesizing a representation of the scene based at least in part on the one or more spatial relationships; extracting a plurality of action sequences corresponding to the plurality of plot-effectuators based at least in part on the portion of the video content; and generating a corresponding synthesized reality (SR) reconstruction of the scene by driving a plurality of digital assets, associated with the plurality of plot-effectuators, within the representation of the scene according to the plurality of action sequences.

22 Claims, 9 Drawing Sheets

700

Related U.S. Application Data

(60)  Provisional application No. 62/734,061, filed on Sep. 20, 2018, provisional application No. 62/620,334, filed on Jan. 22, 2018.

(56)                    References Cited

U.S. PATENT DOCUMENTS

| | | | | |
|---|---|---|---|---|
| 9,438,878 | B2 | 9/2016 | Niebla, Jr et al. | |
| 9,616,338 | B1 * | 4/2017 | Hooper | G06F 3/016 |
| 9,998,664 | B1 * | 6/2018 | Long | H04N 13/189 |
| 2003/0076318 | A1 | 4/2003 | Shaw-Weeks | |
| 2009/0060321 | A1 | 3/2009 | Gillard et al. | |
| 2010/0013931 | A1 | 1/2010 | Golan et al. | |
| 2016/0005228 | A1 | 1/2016 | Niebla, Jr. et al. | |
| 2017/0026574 | A1 | 1/2017 | Kwon et al. | |
| 2017/0220037 | A1 | 8/2017 | Berestov et al. | |
| 2019/0182471 | A1 * | 6/2019 | Khalid | H04N 13/122 |
| 2019/0371073 | A1 | 12/2019 | Harviainen | |
| 2020/0029057 | A1 * | 1/2020 | Holmes | H04N 9/3114 |
| 2020/0117137 | A1 * | 4/2020 | Gasking | G03H 1/08 |
| 2020/0387712 | A1 * | 12/2020 | Richter | G06T 19/006 |
| 2021/0166483 | A1 * | 6/2021 | Kozloski | G06T 19/20 |
| 2022/0224958 | A1 * | 7/2022 | Gibbon | H04N 21/8106 |
| 2022/0326763 | A1 * | 10/2022 | Rekow | G06F 3/012 |
| 2022/0335720 | A1 * | 10/2022 | Chang | H04N 5/2224 |
| 2023/0059673 | A1 * | 2/2023 | Latapie | G06N 5/045 |

FOREIGN PATENT DOCUMENTS

| | | | |
|---|---|---|---|
| CN | 101631257 | A | 1/2010 |
| CN | 101917636 | A | 12/2010 |
| CN | 106060522 | A | 10/2016 |
| CN | 106792151 | A | 5/2017 |
| CN | 108140263 | A | 6/2018 |
| EP | 1164542 | A1 | 12/2001 |
| EP | 2034441 | A1 | 3/2009 |
| JP | 2014072880 | A | 4/2014 |
| KR | 101754700 | B1 | 7/2017 |
| WO | WO2017130158 | A1 | 8/2017 |

OTHER PUBLICATIONS

PCT International Search Report and Written Opinion dated Jun. 26, 2019, International Application No. PCT/US2019/014260, pp. 1-10.

Office Action for corresponding Chinese Application No. 201980008675.1 dated Sep. 28, 2021.

Extended European Search Report dated Oct. 10, 2024, European Application No. 24182361.6, pp. 1-11.

Examination Report for corresponding European Appl. No. 24182361.6 dated Mar. 11, 2026, 6 pages.

* cited by examiner

Comm. Interface(s) 208

CPU(s) 202

204

I/O Devices 206

Programming Interface(s) 210

Operating System 230

SR Experience Engine 240

Data Obtainer 242

Mapper & Locator Engine 244

Coordinator 246

Data Transmitter 248

SR Content Generator 250

Ingester 252

Reconstruction Engine 254

120

320

Operating System 330

SR Presentation Engine 340

Data Obtainer 342

SR Presenter 344

Interaction Handler 346

Data Transmitter 350

Display(s) 312

Comm. Interface(s) 308

CPU(s) 302

304

(Opt) Image Sensor(s) 314

Programming Interface(s) 310

I/O Devices & Sensors 306

502 504 506

500

402
404
250
440
Figure 6

700

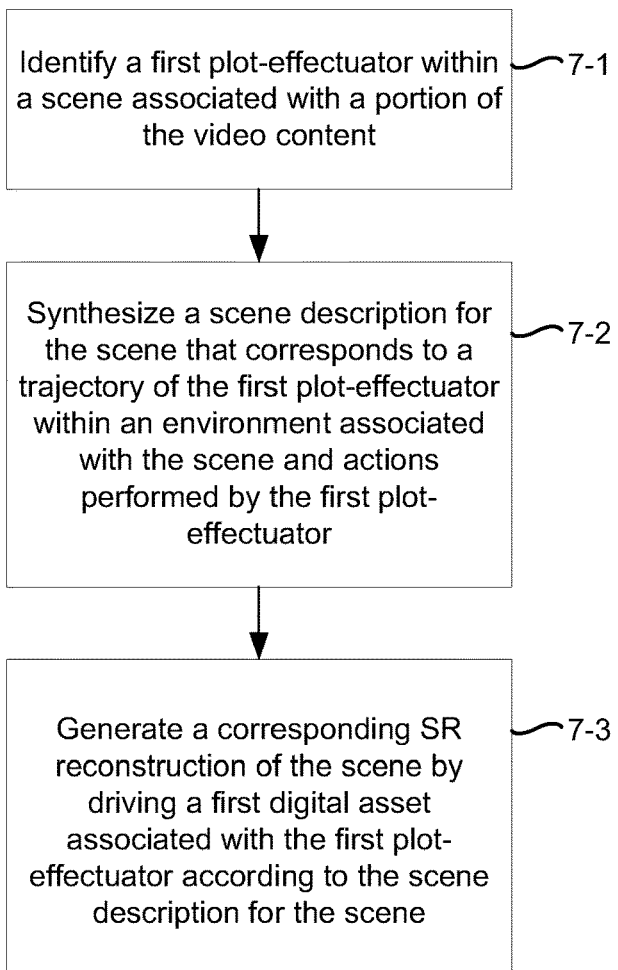

Identify a first plot-effectuator within a scene associated with a portion of the video content —7-1

Synthesize a scene description for the scene that corresponds to a trajectory of the first plot-effectuator within an environment associated with the scene and actions performed by the first plot-effectuator —7-2

Generate a corresponding SR reconstruction of the scene by driving a first digital asset associated with the first plot-effectuator according to the scene description for the scene —7-3

METHOD AND DEVICE FOR GENERATING A SYNTHESIZED REALITY RECONSTRUCTION OF FLAT VIDEO CONTENT

CROSS-REFERENCE TO RELATED APPLICATIONS

This application is a continuation of U.S. patent application Ser. No. 16/961,835, filed on Jul. 13, 2020, which claims priority to International Patent App. No. PCT/US2019/014260, filed on Jan. 18, 2019, U.S. Provisional patent application No. 62/734,061, filed on Sep. 20, 2018, and U.S. Provisional Patent App. No. 62/620,334, filed on Jan. 22, 2018, which are hereby incorporated by reference in their entireties.

TECHNICAL FIELD

The present disclosure generally relates to synthesized reality (SR), and in particular, to systems, methods, and devices for generating an SR reconstruction of flat video content.

BACKGROUND

Virtual reality (VR) and augmented reality (AR) are becoming more popular due to their remarkable ability to alter a user's perception of the world. For example, VR and AR are used for learning purposes, gaming purposes, content creation purposes, social media and interaction purposes, or the like. These technologies differ in the user's perception of his/her presence. VR transposes the user into a virtual space so their VR perception is different from his/her real-world perception. In contrast, AR takes the user's real-world perception and adds something to it.

These technologies are becoming more commonplace due to, for example, miniaturization of hardware components, improvements to hardware performance, and improvements to software efficiency. As one example, a user may experience AR content superimposed on a live video feed of the user's setting on a handheld display (e.g., an AR-enabled mobile phone or tablet with video pass-through). As another example, a user may experience AR content by wearing a head-mounted device (HMD) or head-mounted enclosure that still allows the user to see his/her surroundings (e.g., glasses with optical see-through). As yet another example, a user may experience VR content by using an HMD that encloses the user's field-of-view and is tethered to a computer.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
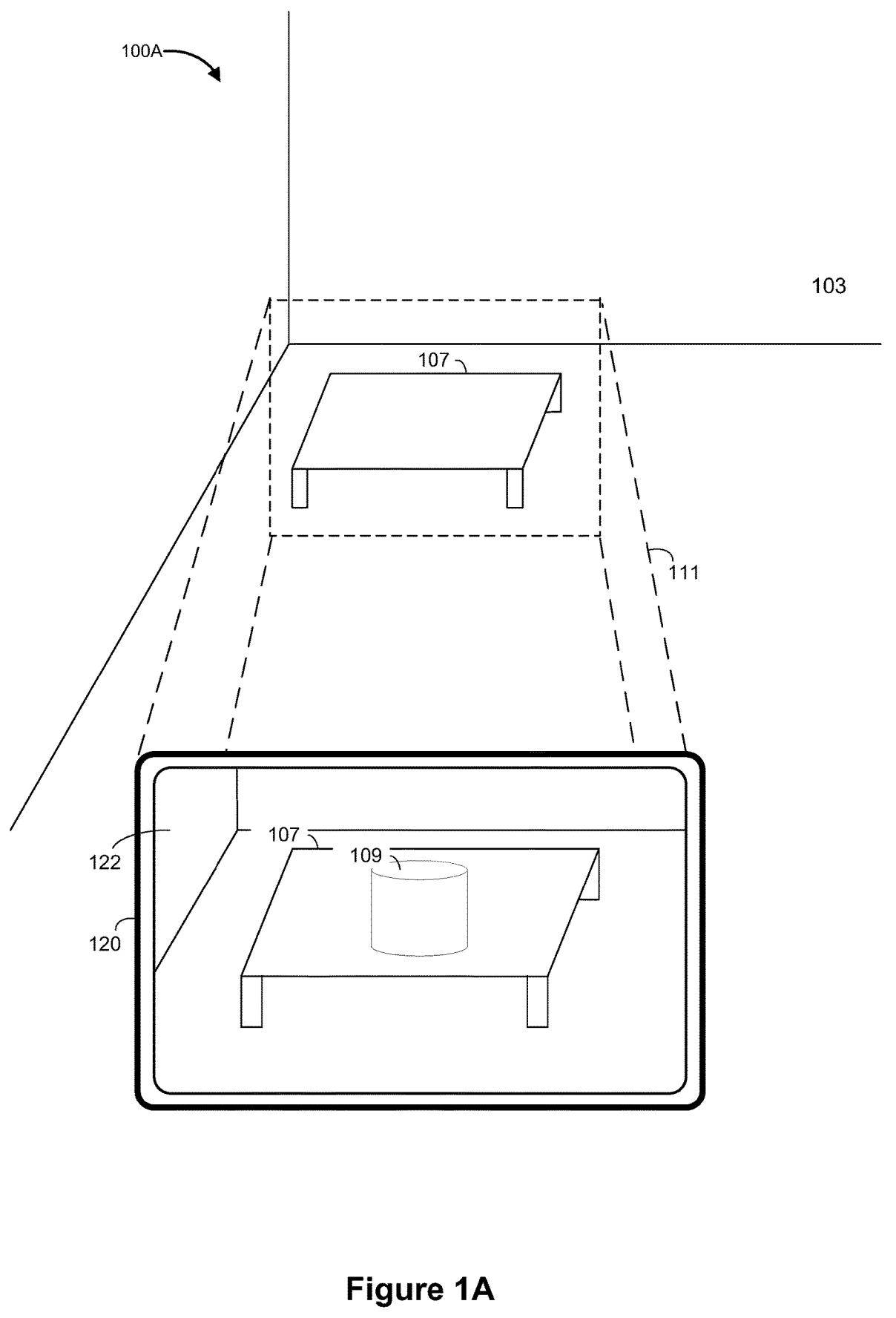

FIG. 1A is a block diagram of an example operating architecture in accordance with some implementations.

FIG. 6 illustrates an example SR content generation scenario in accordance with some implementations.

FIG. 7 is a flowchart representation of a method of generating an SR reconstruction of flat video content in accordance with some implementations.

Figure 1B:
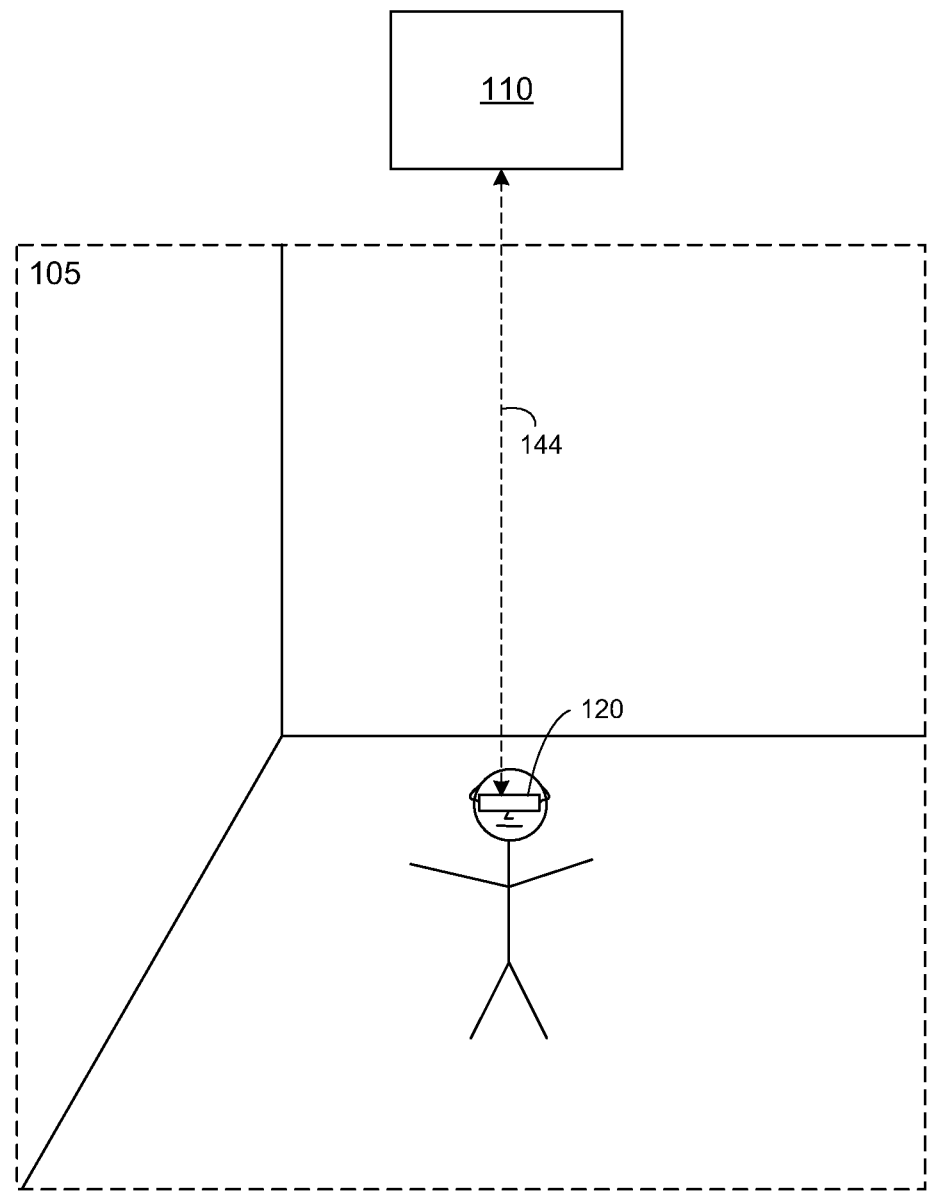
FIG. 1B is a block diagram of another example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for generating synthesized reality (SR) content from flat video content. According to some implementations, the method is performed at a device including non-transitory memory and one or more processors coupled with the non-transitory memory. The method includes: identifying a first plot-effectuator within a scene associated with a portion of video content; synthesizing a scene description for the scene that corresponds to a trajectory of the first plot-effectuator within a setting associated with the scene and actions performed by the first plot-effectuator; and generating a corresponding SR reconstruction of the scene by driving a first digital asset associated with the first plot-effectuator according to the scene description for the scene.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical setting refers to a world that individuals can sense and/or with which individuals can interact without assistance of electronic systems. Physical settings (e.g., a physical forest) include physical elements (e.g., physical trees, physical structures, and physical animals). Individuals can directly interact with and/or sense the physical setting, such as through touch, sight, smell, hearing, and taste.

In contrast, a synthesized reality (SR) setting refers to an entirely or partly computer-created setting that individuals can sense and/or with which individuals can interact via an electronic system. In SR, a subset of an individual's movements is monitored, and, responsive thereto, one or more attributes of one or more virtual objects in the SR setting is changed in a manner that conforms with one or more physical laws. For example, a SR system may detect an individual walking a few paces forward and, responsive thereto, adjust graphics and audio presented to the individual in a manner similar to how such scenery and sounds would change in a physical setting. Modifications to attribute(s) of virtual object(s) in a SR setting also may be made responsive to representations of movement (e.g., audio instructions).

An individual may interact with and/or sense a SR object using any one of his senses, including touch, smell, sight, taste, and sound. For example, an individual may interact with and/or sense aural objects that create a multi-dimensional (e.g., three dimensional) or spatial aural setting, and/or enable aural transparency. Multi-dimensional or spatial aural settings provide an individual with a perception of discrete aural sources in multi-dimensional space. Aural transparency selectively incorporates sounds from the physical setting, either with or without computer-created audio. In some SR settings, an individual may interact with and/or sense only aural objects.

One example of SR is virtual reality (VR). A VR setting refers to a simulated setting that is designed only to include computer-created sensory inputs for at least one of the senses. A VR setting includes multiple virtual objects with which an individual may interact and/or sense. An individual may interact and/or sense virtual objects in the VR setting through a simulation of a subset of the individual's actions within the computer-created setting, and/or through a simulation of the individual or his presence within the computer-created setting.

Another example of SR is mixed reality (MR). A MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation and/or location with respect to the physical setting to enable interaction between virtual objects and real objects (which are physical elements from the physical setting or representations thereof). For example, a system may monitor movements so that a virtual plant appears stationery with respect to a physical building.

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical element captured by imaging sensor(s). In another example, a virtual object may exhibit characteristics consistent with actual weather conditions in the physical setting, as identified via imaging, weather-related sensors, and/or online weather data. In yet another example, an augmented reality forest may have virtual trees and structures, but the animals may have features that are accurately reproduced from images taken of physical animals.

Many electronic systems enable an individual to interact with and/or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

A user may wish to experience video content (e.g., a TV episode or movie) as if he/she is in the scene with the characters. In other words, the user wishes to view the video content as an SR experience instead of simply viewing the video content on a TV or other display device.

Often SR content is painstakingly created ahead of time and accessed by a user from a library of available SR content. The disclosed implementations include a method of generating an on-demand SR reconstruction of video content by leveraging digital assets. As such, flat video content may be seamlessly and quickly be ported into an SR experience.

FIG. 1A is a block diagram of an example operating architecture 100A in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100A includes an electronic device 120.

In some implementations, the electronic device 120 is configured to present the SR experience to a user. In some implementations, the electronic device 120 includes a suitable combination of software, firmware, and/or hardware. The electronic device 120 is described in greater detail below with respect to FIG. 3. According to some implementations, the electronic device 120 presents a synthesized reality (SR) experience to the user 150 while the user is physically present within a physical setting 103 that includes a table 107 within the field-of-view 111 of the electronic device 120. As such, in some implementations, the user holds the electronic device 120 in his/her hand(s). In some implementations, while presenting an augmented reality (AR) experience, the electronic device 120 is configured to present AR content (e.g., an AR cylinder 109) and to enable video pass-through of the physical setting 103 (e.g., including the table 107) on a display 122.

FIG. 1B is a block diagram of an example operating architecture 100B in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100B includes a controller 110 and an electronic device 120.

In some implementations, the controller 110 is configured to manage and coordinate an SR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the physical setting 105. For example, the controller 110 is a local server located within the physical setting 105. In another example, the controller 110 is a remote server located outside of the physical setting 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.).

In some implementations, the electronic device 120 is configured to present the SR experience to the user 150. In some implementations, the electronic device 120 includes a suitable combination of software, firmware, and/or hardware. The electronic device 120 is described in greater detail below with respect to FIG. 3. In some implementations, the functionalities of the controller 110 and/or the display device 130 are provided by and/or combined with the electronic device 120.

According to some implementations, the electronic device 120 presents a synthesized reality (SR) experience to the user 150 while the user 150 is virtually and/or physically present within a physical setting 105. In some implementations, while presenting an augmented reality (AR) experience, the electronic device 120 is configured to present AR content and to enable optical see-through of the physical setting 105. In some implementations, while presenting a virtual reality (VR) experience, the electronic device 120 is configured to present VR content and to optionally enable video pass-through of the physical setting 105.

In some implementations, the user 150 wears the electronic device 120 on his/her head such as a head-mounted device (HMD). As such, the electronic device 120 includes one or more displays provided to display the SR content. For example, the electronic device 120 encloses the field-of-view of the user 150. As another example, the electronic device 120 slides into or otherwise attaches to a head mounted enclosure. In some implementations, the electronic device 120 is replaced with an SR chamber, enclosure, or room configured to present SR content in which the user 150 does not wear the electronic device 120.

Figure 2:
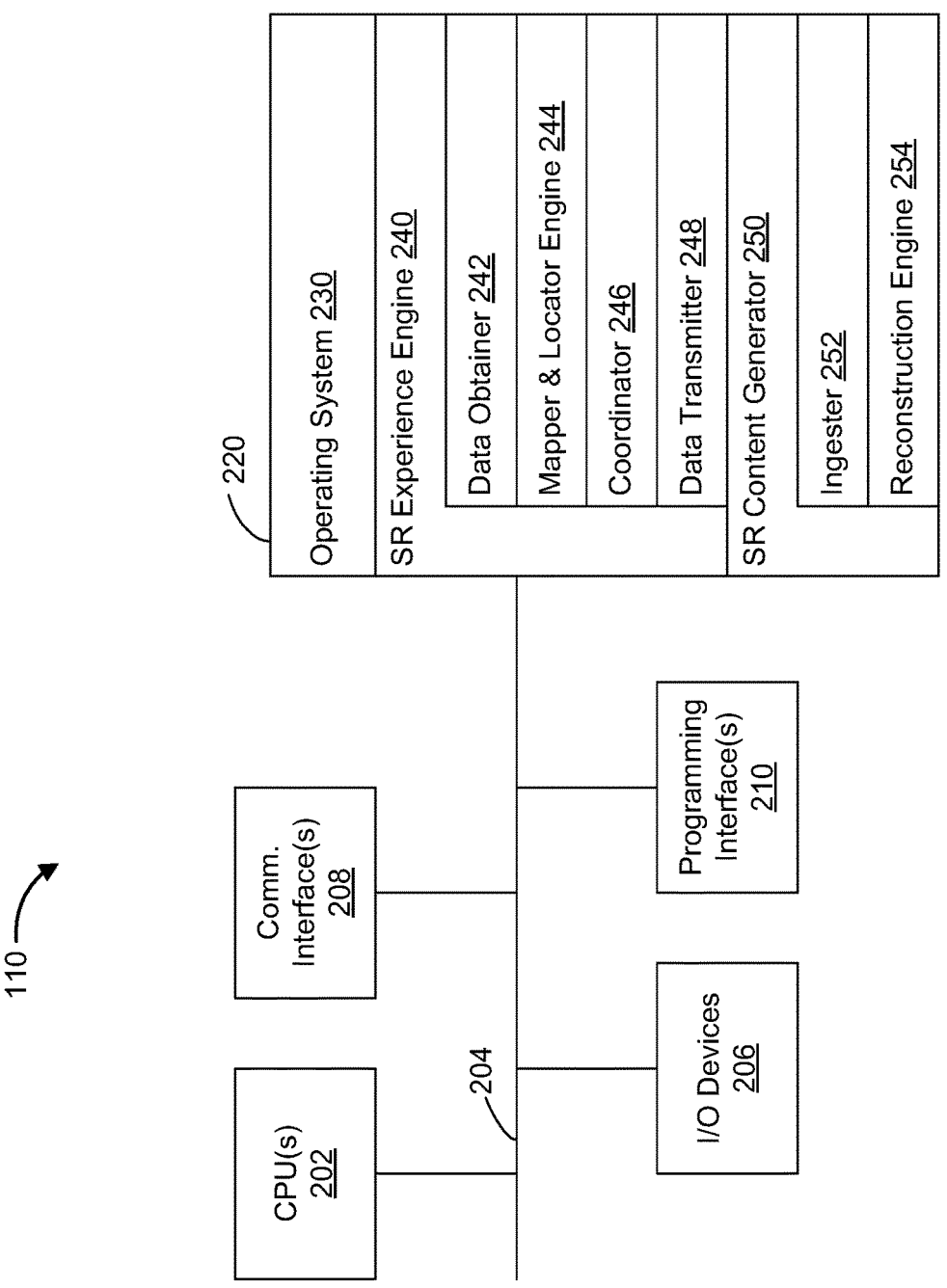
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230, a synthesized reality (SR) experience engine 240, and an SR content generator 250.

The operating system 230 includes procedures for handling various basic system services and for performing hardware dependent tasks.

In some implementations, the SR experience engine 240 is configured to manage and coordinate one or more SR experiences for one or more users (e.g., a single SR experience for one or more users, or multiple SR experiences for respective groups of one or more users). To that end, in various implementations, the SR experience engine 240 includes a data obtainer 242, a mapper and locator engine 244, a coordinator 246, and a data transmitter 248.

In some implementations, the data obtainer 242 is configured to obtain data (e.g., presentation data, user interaction data, sensor data, location data, etc.) from at least one of sensors in the physical setting 105, sensors associated with the controller 110, and the electronic device 120. To that end, in various implementations, the data obtainer 242 includes instructions and/or logic therefor, and heuristics and metadata therefor.

In some implementations, the mapper and locator engine 244 is configured to map the physical setting 105 and to track the position/location of at least the electronic device 120 with respect to the physical setting 105. To that end, in various implementations, the mapper and locator engine 244 includes instructions and/or logic therefor, and heuristics and metadata therefor.

In some implementations, the coordinator 246 is configured to manage and coordinate the SR experience presented to the user by the electronic device 120. To that end, in various implementations, the coordinator 246 includes instructions and/or logic therefor, and heuristics and metadata therefor.

In some implementations, the data transmitter 248 is configured to transmit data (e.g., presentation data, location data, etc.) to at least the electronic device 120. To that end, in various implementations, the data transmitter 248 includes instructions and/or logic therefor, and heuristics and metadata therefor.

In some implementations, the SR content generator 250 is configured to generate an SR reconstruction of a scene from video content. To that end, in various implementations, the SR content generator 250 includes an ingester 252 and a reconstruction engine 254.

In some implementations, the ingester 252 is configured to obtain video content (e.g., a 2-dimensional or "flat" AVI, FLV, WMV, MOV, MP4, or the like file associated with a TV episode or a movie). In some implementations, the ingester 252 is also configured to perform a scene comprehension process and a scene parsing process on the scene in order to synthesize a scene description for the scene (e.g., a portion of the video content associated with a plot setting, key frame, or the like). The ingester 252 is discussed in more detail below with reference to FIG. 4.

In some implementations, the reconstruction engine 254 is configured to obtain digital assets associated with the scene within the video content (e.g., character point clouds, item/object point clouds, scene setting point clouds, video game models, item/object models, scene setting models, and/or the like). In some implementations, the reconstruction engine 254 is also configured to instantiate a thread for each of the plot-effectuators within the scene. In some implementations, the reconstruction engine 254 is further configured to the drive digital assets according to the scene description in order to generate an SR reconstruction of the scene.

Although the SR experience engine 240 and the SR content generator 250 are shown as residing on a single device (e.g., the controller 110), it should be understood that in other implementations, any combination of the SR experience engine 240 and the SR content generator 250 may be located in separate computing devices.

Moreover, FIG. 2 is intended more as a functional description of the various features which be present in a particular embodiment as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 3:
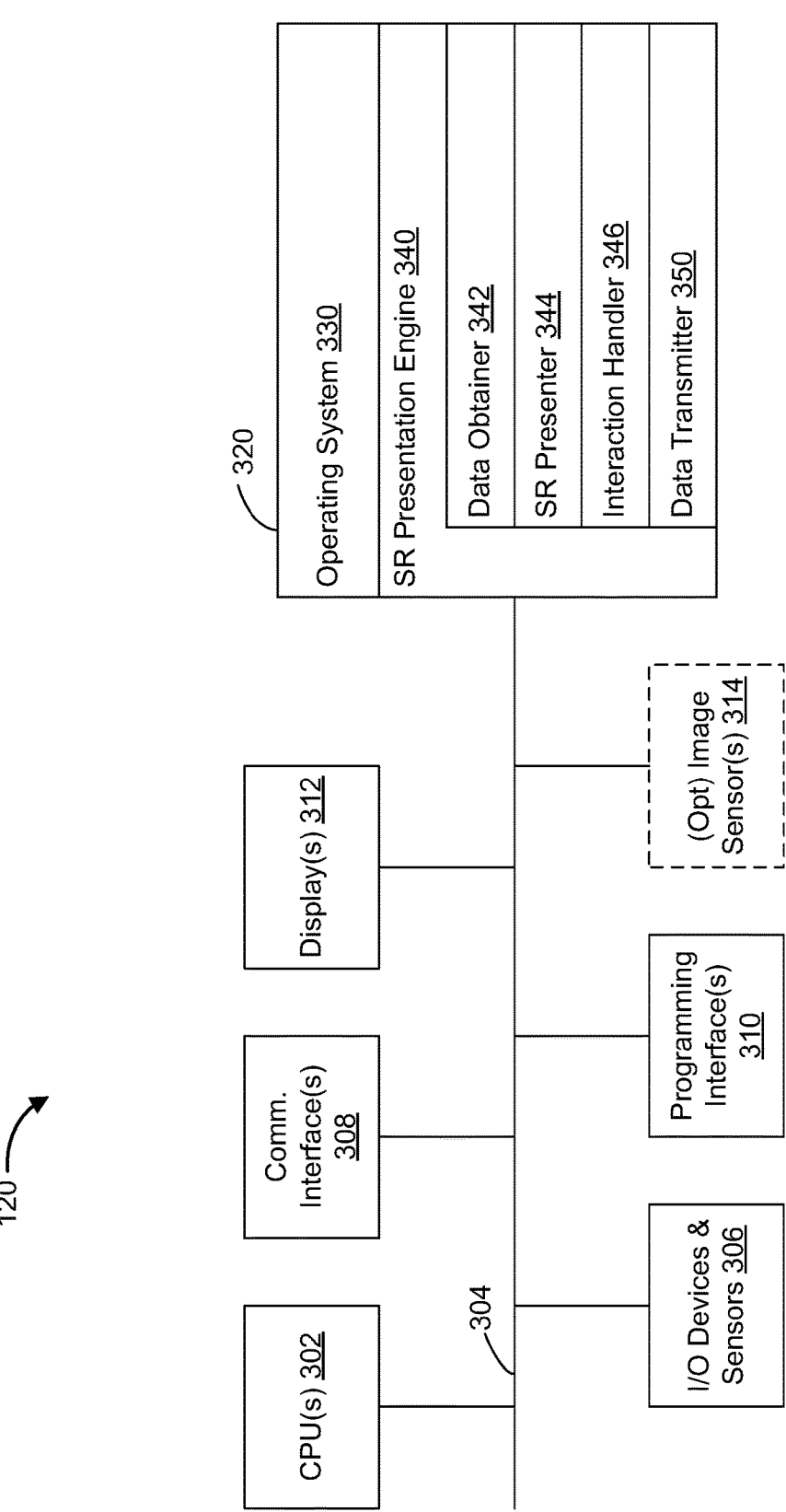
FIG. 3 is a block diagram of an example electronic device in accordance with some implementations.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, one or more optional interior and/or exterior facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, one or more depth sensors (e.g., structured light, time-of-flight, or the like), and/or the like.

In some implementations, the one or more displays 312 are configured to present the SR experience to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical setting 105). In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single SR display. In another example, the electronic device 120 includes an SR display for each eye of the user. In some implementations, the one or more displays 312 are capable of presenting AR and VR content. In some implementations, the one or more displays 312 are capable of presenting AR or VR content. In some implementations, the one or more optional image sensors 314 correspond to one or more RGB cameras (e.g., with a complementary metal-oxide-semiconductor (CMOS) image sensor or a charge-coupled device (CCD) image sensor), IR image sensors, event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an SR presentation engine 340.

The operating system 330 includes procedures for handling various basic system services and for performing hardware dependent tasks. In some implementations, the SR presentation engine 340 is configured to present SR content to the user via the one or more displays 312. To that end, in various implementations, the SR presentation engine 340 includes a data obtainer 342, an SR presenter 344, an interaction handler 346, and a data transmitter 350.

In some implementations, the data obtainer 342 is configured to obtain data (e.g., presentation data, user interaction data, sensor data, location data, etc.) from at least one of sensors in the physical setting 105, sensors associated with the electronic device 120, and the controller 110. To that end, in various implementations, the data obtainer 342 includes instructions and/or logic therefor, and heuristics and metadata therefor.

In some implementations, the SR presenter 344 is configured to present and update SR content via the one or more displays 312. To that end, in various implementations, the SR presenter 344 includes instructions and/or logic therefor, and heuristics and metadata therefor.

In some implementations, the interaction handler 346 is configured to detect and interpret user interactions with the presented SR content. To that end, in various implementations, the interaction handler 346 includes instructions and/or logic therefor, and heuristics and metadata therefor.

In some implementations, the data transmitter 350 is configured to transmit data (e.g., presentation data, location data, user interaction data, etc.) to at least the controller 110. To that end, in various implementations, the data transmitter 350 includes instructions and/or logic therefor, and heuristics and metadata therefor.

Although the data obtainer 342, the SR presenter 344, the interaction handler 346, and the data transmitter 350 are shown as residing on a single device (e.g., the electronic device 120), it should be understood that in other implementations, any combination of the data obtainer 342, the SR presenter 344, the interaction handler 346, and the data transmitter 350 may be located in separate computing devices.

Moreover, FIG. 3 is intended more as a functional description of the various features which be present in a particular embodiment as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 4:
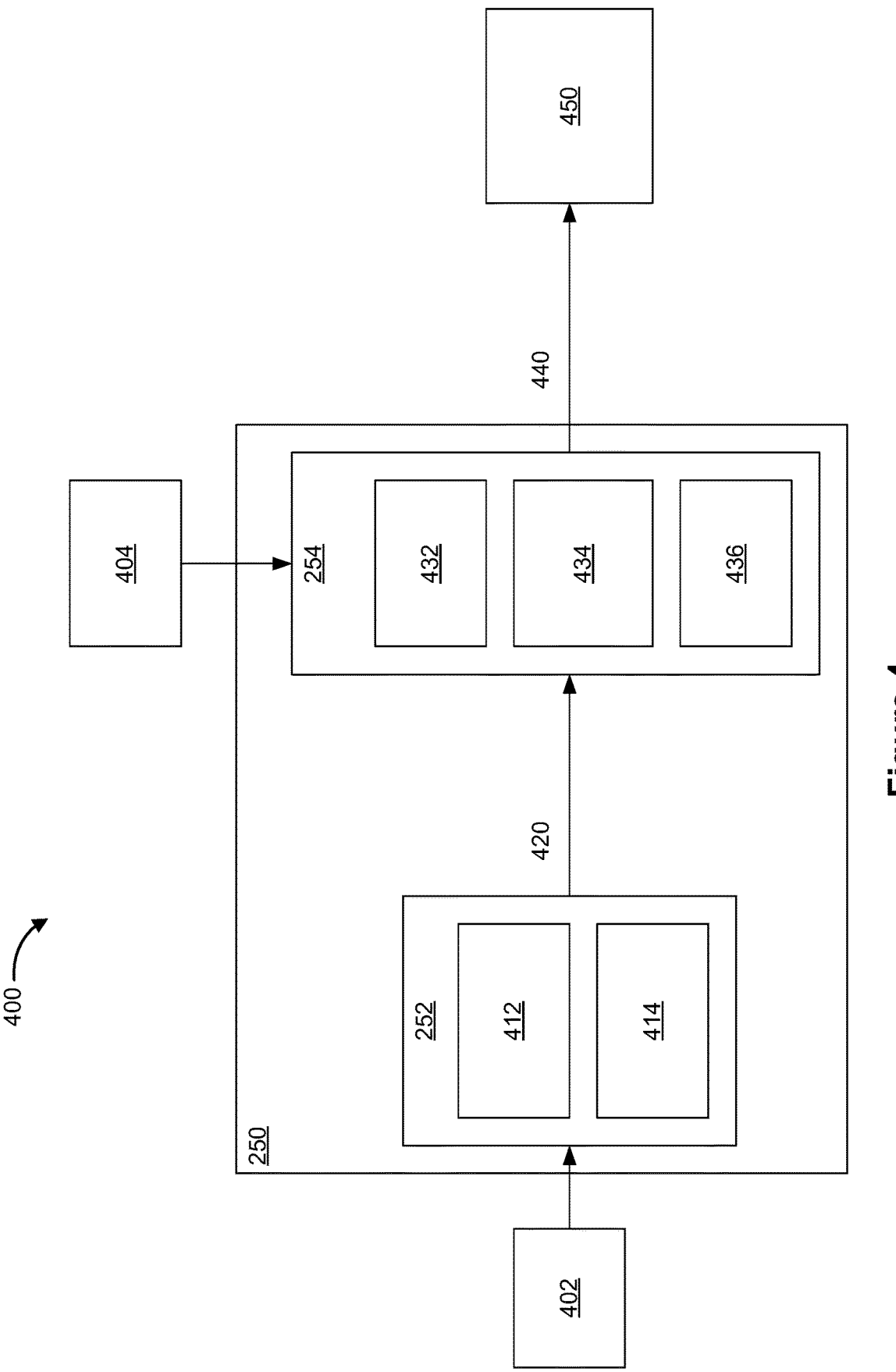
FIG. 4 is a block diagram of a synthesized reality (SR) content generation architecture in accordance with some implementations.

FIG. 4 illustrates an example SR content generation architecture 400 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the SR content generation architecture 400 includes the SR content generator 250, which generates an SR reconstruction 440 of a scene within video content 402 by driving digital assets 404 (e.g., a video game model of a character/actor, a point cloud of a character/actor, and/or the like) according to a scene description 420. As shown in FIG. 2, the SR content generator 250 includes the ingester 252 and the reconstruction engine 254.

In some implementations, the ingester 252 is configured to obtain the video content 402 in response to a request (e.g., a command from a user). For example, the SR content generator 250 obtains a request from a user to view an SR reconstruction of specified video content (e.g., a TV episode or movie). Continuing with this example, in response to obtaining the request, the SR content generator 250 or a component thereof (e.g., the ingester 252) obtains (e.g., receives or retrieves) the video content 402 from a local library or a remote library (e.g., a remote server, a third-party content provider, or the like). In some implementations, the ingester 252 is also configured to perform a scene comprehension process and a scene parsing process on the scene in order to synthesize a scene description 420 for the particular scene within the video content 402 (e.g., a portion of the video content associated with a plot setting, key frame, or the like).

To that end, in some implementations, the ingester 252 includes a scene comprehension engine 412 and a scene parsing engine 414. In some implementations, the scene comprehension engine 412 is configured to perform a scene comprehensions process on a scene in the video content 402. In some implementations, as part of the scene comprehension process, the scene comprehension engine 412 identifies plot-effectuators, actionable objects, and unactionable environmental elements and infrastructure within the scene. For example, the plot-effectuators correspond to characters (e.g., humanoids, animals, androids, robots, or the like) within the scene that affect the plot associated with the scene. For example, the actionable objects correspond to environmental elements within the scene (e.g., tools, drinking vessels, movable furniture such as chairs, or the like) that are acted on by the plot-effectuators. For example, the unactionable environmental elements and infrastructure correspond to environmental elements within the scene (e.g., carpet, immovable furniture, walls, or the like) that are not acted on by the plot-effectuators. The plot-effectuators, actionable objects, and unactionable environmental elements and infrastructure are described in more detail below with reference to FIG. 5.

In some implementations, the scene comprehension engine 412 identifies the plot-effectuators within the scene based on a facial, skeletal, and/or humanoid recognition technique. In some implementations, the scene comprehension engine 412 identifies the plot-effectuators within the scene based on an object recognition and/or classification technique. In some implementations, the scene comprehension engine 412 identifies the actionable objects and unactionable environmental elements and infrastructure within the scene based on an object recognition and/or classification technique.

In some implementations, as part of the scene comprehension process, the scene comprehension engine 412 additionally determines spatial relationships between the plot-effectuators, actionable objects, and unactionable environmental elements and infrastructure in the scene. For example, the scene comprehension engine 412 creates a 3-dimensional map of the setting associated with the scene and locates the plot-effectuators, actionable objects, and unactionable environmental elements and infrastructure relative to the 3-dimensional map.

In some implementations, the scene parsing engine 414 is configured to perform a scene parsing process on the scene in the video content 402. In some implementations, as part of the scene parsing process, the scene parsing engine 414 determines an action sequence for each of the plot-effectuators within the scene. For example, an action sequence associated with a first plot-effectuator for the scene includes the following temporally-ordered sequence of actions: walk in door, sit down in chair A, pick up coffee cup, drink from coffee cup, put coffee cup down, stand up, speak with second plot-effectuator, wave arms, walk around table, and walk out of door. In some implementations, as part of the scene parsing process, the scene parsing engine 414 also determines a trajectory for each of the plot-effectuators within the scene. For example, a trajectory sequence associated with a first plot-effectuator within the scene includes a route or path the first plot-effectuator takes relative to the 3-dimensional map of the setting associated with the scene.

In some implementations, the ingester engine 252 leverages external data related to the video content 402 when performing the scene comprehension and scene parsing processes (e.g., existing scene summaries, scene action sequences, scene information, and/or the like). In some implementations, the ingester 252 is configured to synthesize the scene description 420 that includes an action sequence and trajectory for each plot-effectuator relative to the 3-dimensional map of the setting associated with the scene.

In some implementations, the reconstruction engine 254 is configured to obtain digital assets 404 associated with the video content 402 in response to the aforementioned request. For example, the SR content generator 250 obtains a request from a user to view an SR reconstruction of specified video content (e.g., a TV episode or movie). Continuing with this example, in response to obtaining the request, the SR content generator 250 or a component thereof (e.g., the reconstruction engine 254) obtains (e.g., receives or retrieves) the digital assets 404 from a local library or a remote library (e.g., a remote server, a third-party asset provider, or the like). For example, the digital assets 404 include point clouds associated with plot-effectuators (e.g., characters or actors) within the video content 402, video game models associated with plot-effectuators (e.g., characters or actors) within the video content 402, and/or the like. In another example, the digital assets 404 include point clouds, models, and/or the like associated with items and/or objects (e.g., furniture, household items, appliances, tools, food, etc.). In yet another example, the digital assets 404 include point clouds, models, and/or the like associated with the setting associated with the scene.

In some implementations, if a point cloud or video game model for a plot-effectuator is unavailable, the reconstruction engine 254 is configured to generate a model for the plot-effectuator based on the video content 402 and/or other external data associated with the plot-effectuator (e.g., other video content, images, dimensions, etc. associated with the plot-effectuator).

In some implementations, the reconstruction engine 254 includes: a scene setting generator 432, a thread handler 434, and a digital asset driver 436. In some implementations, the scene setting generator 432 is configured to generate an SR reconstruction of the scene setting associated with the scene. In some implementations, the scene setting generator 432 generates the SR reconstruction of the scene setting based at least in part on the digital assets 404. In some implementations, the scene setting generator 432 generates the SR reconstruction of the scene setting based at least in part by synthesizing a 3-dimensional model of the scene setting associated with the scene based on environmental elements and infrastructure recognized within the scene.

In some implementations, the thread handler 434 is configured to instantiate and manage a thread for each of the plot-effectuators within the scene. In some implementations, the thread handler 434 is also configured to instantiate and manage a thread for each of the actionable objects within the scene.

In some implementations, the digital asset driver 436 is configured to drive the digital assets for each of the plot-effectuators (e.g., video game assets or point clouds) according to the scene description 420. In some implementations, the digital asset driver 436 drives the digital assets according to natural speech, natural biodynamics/movement, and/or the like techniques. For example, facial features (e.g., lips, mouth, cheeks, etc.) of a digital asset for a respective plot-effectuator are synchronized to a speech track for the respective plot-effectuator.

In some implementations, the reconstruction engine 254 is configured to generate the SR reconstruction 440 of the scene by driving the digital assets 404 according to the scene description 420 within the SR reconstruction of the setting associated with the scene. In some implementations, the SR reconstruction 440 is provided to SR presentation pipeline 450 for presentation to the user. In some implementations, the SR reconstruction 440 is rendered by the controller 110 and transmitted to the electronic device 120 as presentation data, where the SR reconstruction 440 is presented via the one or more displays 312.

Figure 5:
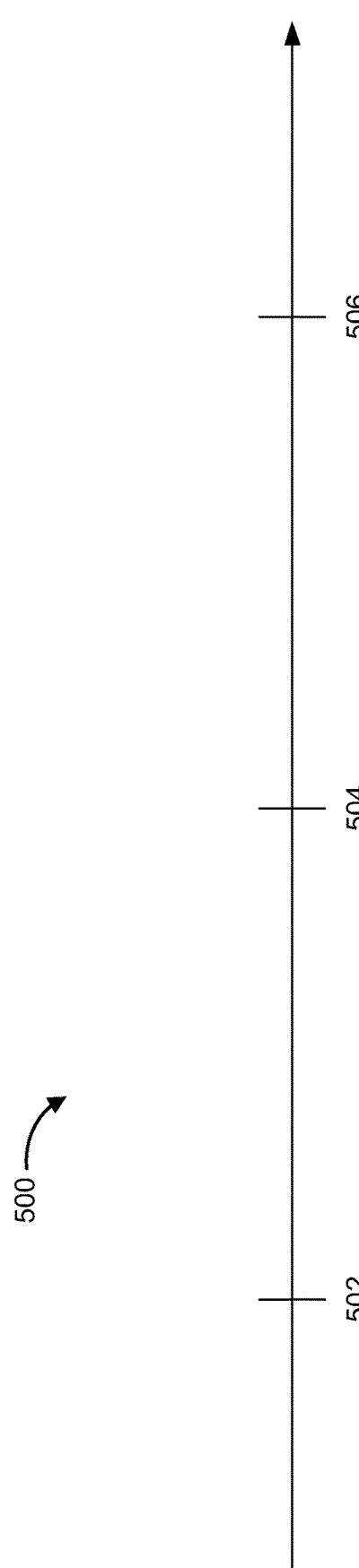
FIG. 5 illustrates a scene understanding spectrum in accordance with some implementations.

FIG. 5 illustrates an example scene understanding spectrum 500 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the scene understanding spectrum 500 includes a spectrum of scene elements identified within the scene by the SR content generation unit 250 in FIGS. 2 and 4 or a component thereof (e.g., the scene comprehension unit 412 in FIG. 4) ordered based on how dynamic the scene elements are within the scene (e.g., movement, speech, etc.).

In some implementations, as part of the scene comprehension process, the scene comprehension engine 412 identifies unactionable environmental elements and infrastructure 502 within the scene, actionable objects 504, and plot-effectuators 506. For example, the plot-effectuators 506 correspond to characters (e.g., humanoids, animals, androids, robots, or the like) within the scene that affect the plot associated with the scene. For example, the actionable objects 504 correspond to environmental elements within the scene (e.g., tools, drinking vessels, furniture, or the like) that are acted on by the plot-effectuators. For example, the unactionable environmental elements and infrastructure 502 correspond to environmental elements within the scene (e.g., carpet, furniture, walls, or the like) that are not acted on by the plot-effectuators 506. As such, the plot-effectuators 506 may move significantly within the scene, generate audible noises or speech, or act on actionable objects 504 (e.g., a ball, steering wheel, sword, or the like), which are also put in motion within the scene, but the unactionable environmental elements and infrastructure 502 are static scene elements that are unchanged by the actions of the plot-effectuators 506.

FIG. 6 illustrates an example SR content generation scenario 600 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, in the SR content generation scenario 600, the video content 402 (e.g., a flat TV episode or movie) and the digital assets 404 (e.g., point clouds or video game models associated with plot-effectuators in the video content 402) are provided as inputs to the SR content generator 250 in FIGS. 2 and 4. As described above with reference to FIG. 4, the SR content generator 250 synthesizes a scene description 420 for a particular scene within the video content 402 and generates an SR reconstruction 440 of the scene by driving the digital assets 404 according to the scene description 420.

FIG. 7 is a flowchart representation of a method 700 of generating an SR reconstruction of flat video content in accordance with some implementations. In various implementations, the method 700 is performed by a device with one or more processors and non-transitory memory (e.g., the controller 110 in FIGS. 1B and 2, the electronic device 120 in FIGS. 1A-1B and 3, or a suitable combination thereof) or a component thereof (e.g., the SR content generator 250 in FIGS. 2 and 4). In some implementations, the method 700 is performed by processing logic, including hardware, firmware, software, or a combination thereof. In some implementations, the method 700 is performed by a processor executing code stored in a non-transitory computer-readable medium (e.g., a memory). Briefly, in some circumstances, the method 700 includes: identifies a first plot-effectuator within a scene associated with a portion of video content; synthesizes a scene description for the scene that corresponds to a trajectory of the first plot-effectuator within a setting associated with the scene and actions performed by the first plot-effectuator; and generates a corresponding SR reconstruction of the scene by driving a first digital asset associated with the first plot-effectuator according to the scene description for the scene.

As represented by block 7-1, the method 700 includes identifying a first plot-effectuator (e.g., a character or object that will be associated with a thread) within a scene associated with a portion of video content. In some implementations, the SR content generator 250 or a component thereof (e.g., the scene comprehension engine 412 in FIG. 4) identifies the first plot-effectuator as part of a scene comprehension process. In some implementations, the first plot-effectuator corresponds to a humanoid character, android character, animal, vehicle, or the like (e.g., an entity that performs actions and/or completes objectives). In some implementations, the SR content generator 250 or a component thereof (e.g., the scene comprehension engine 412 in FIG. 4) identifies one or more other plot-effectuators within the scene as part of a scene comprehension process. For example, the SR content generator 250 or a component thereof (e.g., the scene comprehension engine 412 in FIG. 4) performs the scene comprehension process on a per-scene basis based on key-frames or the like. The process associated with identifying plot-effectuators is described in more detail above with reference to FIG. 4.

As represented by block 7-2, the method 700 includes synthesizing a scene description for the scene that corresponds to a trajectory of the first plot-effectuator within a setting associated with the scene and actions performed by the first plot-effectuator. In some implementations, the scene description is generated from an image captioning/parsing process, whereby, first, the SR content generator 250 performs object/humanoid recognition on each frame. Next, the SR content generator 250 determines the spatial relationship (e.g., depth) between the recognized objects/humanoids and the scene/setting. Then, the SR content generator 250 instantiates threads for recognized objects/humanoids. Next, the SR content generator 250 generates a scene description for the video content that tracks the threads (e.g., a screenplay). In some implementations, the scene description includes an action sequence and also the trajectory of each plot-effectuator within the scene. The process associated with synthesizing the scene description is described in more detail above with reference to FIG. 4.

As represented by block 7-3, the method 700 includes generating a corresponding SR reconstruction of the scene by driving a first digital asset associated with the first plot-effectuator according to the scene description for the scene. In some implementations, the SR content generator 250 also leverages other digital assets associated with the setting for the scene, objects, and/or the like to generate the SR reconstruction of the scene. The SR reconstruction process is described in more detail above with reference to FIG. 4.

In some implementations, the digital assets correspond to video game models for the plot-effectuators (e.g., characters/actors) in the video content. In some implementations, the digital assets correspond to skinned point clouds associated with the plot-effectuators (e.g., characters/actors) in the video content. In some implementations, the digital assets correspond to models for the setting associated with the scene and the objects within the setting.

Figure 8:
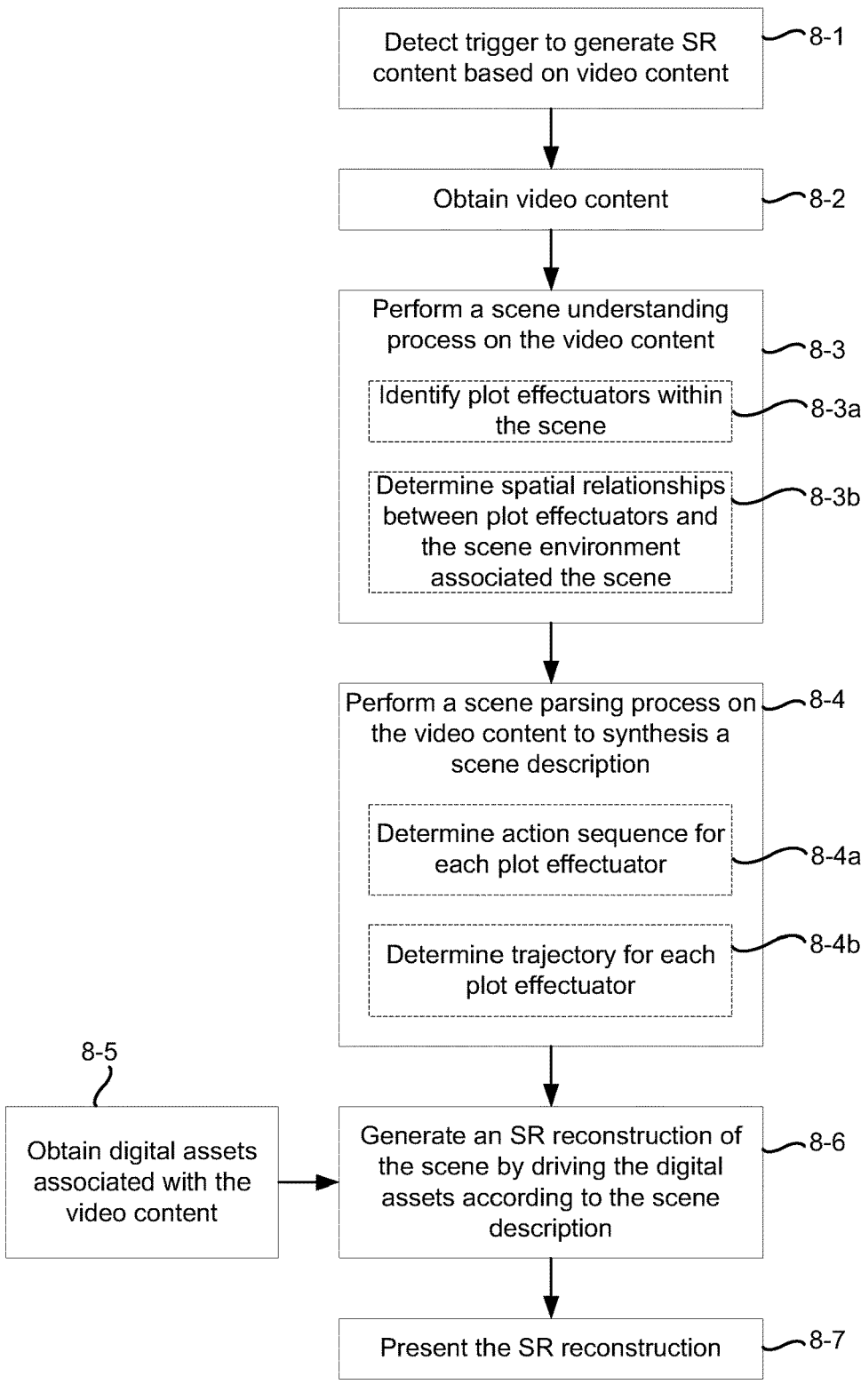
FIG. 8 is a flowchart representation of a method of generating an SR reconstruction of flat video content in accordance with some implementations.

FIG. 8 is a flowchart representation of a method 800 of generating an SR reconstruction of flat video content in accordance with some implementations. In various implementations, the method 800 is performed by a device with one or more processors and non-transitory memory (e.g., the controller 110 in FIGS. 1B and 2, the electronic device 120 in FIGS. 1A-1B and 3, or a suitable combination thereof) or a component thereof (e.g., the SR content generator 250 in FIGS. 2 and 4). In some implementations, the method 800 is performed by processing logic, including hardware, firmware, software, or a combination thereof. In some implementations, the method 800 is performed by a processor executing code stored in a non-transitory computer-readable medium (e.g., a memory). Briefly, in some circumstances, the method 800 includes: detecting a trigger to generate SR content based on specified video content; obtaining the video content; performing a scene understanding process on the video content; performing a scene parsing process on the video content to synthesize a scene description; obtaining digital assets associated with the video content; generating an SR reconstruction of the scene by driving the digital assets according to the scene description; and presenting the SR reconstruction.

As represented by block 8-1, the method 800 includes detecting a trigger to generate SR content based on video content. In some implementations, the SR content generator 250 or a component thereof obtains a request from a user to view an SR reconstruction of specified video content (e.g., a TV episode or movie). As such, the request from a user to view an SR reconstruction of specified video content which corresponds to the trigger to generate the SR content based on the specified video content.

As represented by block 8-2, the method 800 includes obtaining the video content. In some implementations, the SR content generator 250 or a component thereof obtains (e.g., receives or retrieves) the video content. For example, the SR content generator 250 obtains the video content from a local library or a remote library (e.g., a remote server, a third-party content provider, or the like).

In some implementations, the SR content generator 250 or a component thereof obtains (e.g., receives or retrieves) audio content in place of or in addition to the video content. For example, the audio content corresponds to the soundtrack or audio portion associated with the video content. As such, in some implementations, the SR content generator 250 creates an SR reconstruction of the video content based at least in part on the video content, the associated audio content, and/or external data associated with the video content (e.g., pictures of actors in the video content, height and other measurements of actors in the video content, various views (e.g., plan, side, perspective, etc. views) of sets and objects, and/or the like. In another example, the audio content corresponds to an audiobook, radio drama, or the like. As such, in some implementations, the SR content generator 250 creates an SR reconstruction of the audio content based at least in part on the audio content and external data associated with the audio content (e.g., pictures of characters in the audio content, height and other measurements of the characters in the audio content, various views (e.g., plan, side, perspective, etc. views) of sets and objects, and/or the like.

In some implementations, the SR content generator 250 or a component thereof obtains (e.g., receives or retrieves) text content in place of or in addition to the video content. For example, the text content corresponds to the screenplay or script associated with the video content. As such, in some implementations, the SR content generator 250 creates an SR reconstruction of the video content based at least in part on the video content, the associated text content, and/or external data associated with the video content (e.g., pictures of actors in the video content, height and other measurements of actors in the video content, various views (e.g., plan, side, perspective, etc. views) of sets and objects, and/or the like. In another example, the text content corresponds to a novel, book, play, or the like. As such, in some implementations, the SR content generator 250 creates an SR reconstruction of the test content based at least in part on the text content and external data associated with the audio content (e.g., pictures of characters in the text content, height and other measurements of the characters in the text content, various views (e.g., plan, side, perspective, etc. views) of sets and objects, and/or the like.

As represented by block 8-3, the method 800 includes performing a scene understanding process on the video content. In some implementations, the SR content generator 250 or a component thereof (e.g., the scene comprehension engine 412) performs the scene understanding process on the video content. The scene understanding process is described in more detail above with reference to FIG. 4.

In some implementations, as represented by block 8-3a, the method 800 includes identifying plot-effectuators within the scene. In some implementations, the SR content generator 250 or a component thereof (e.g., the scene comprehension engine 412) identifies plot-effectuators, actionable objects, and unactionable environmental elements and infrastructure within the scene.

For example, the plot-effectuators correspond to characters (e.g., humanoids, animals, androids, vehicles, robots, or the like) within the scene that affect the plot associated with the scene. For example, the actionable objects correspond to environmental elements within the scene (e.g., tools, toys, drinking vessels, furniture, or the like) that are acted on by the plot-effectuators. For example, the unactionable environmental elements and infrastructure correspond to environmental elements within the scene (e.g., carpet, furniture, walls, or the like) that are not acted on by the plot-effectuators. The plot-effectuators, actionable objects, and unactionable environmental elements and infrastructure are described in more detail below with reference to FIG. 5.

In some implementations, the scene comprehension engine 412 identifies the plot-effectuators within the scene based on a facial, skeletal, and/or humanoid recognition technique. In some implementations, the scene comprehension engine 412 identifies the plot-effectuators within the scene based on an object recognition and/or classification technique. In some implementations, the scene comprehension engine 412 identifies the actionable objects and unactionable environmental elements and infrastructure within the scene based on an object recognition and/or classification technique.

In some implementations, as represented by block 8-3*b*, the method 800 includes determining spatial relationships between the plot-effectuators and the scene setting associated with the scene. For example, the scene corresponds to a theatrical scene or a predefined portion of the video content. In some implementations, the SR content generator 250 or a component thereof (e.g., the scene comprehension engine 412) determines spatial relationships between the plot-effectuators, actionable objects, and unactionable environmental elements and infrastructure in the scene. For example, the scene comprehension engine 412 creates a 3-dimensional map of the setting associated with the scene and locates the plot-effectuators, actionable objects, and unactionable environmental elements and infrastructure relative to the 3-dimensional map. As such, for example, the SR content generator 250 determines where the plot-effectuators are in the depth dimension relative to the setting associated with the scene.

In some implementations, the SR content generator 250 or a component thereof (e.g., the scene comprehension engine 412) identifies at least one environmental element within the scene (e.g., furniture or the like) and determines the spatial relationship between at least the first plot-effectuator and the at least one environmental element. In some implementations, the walls/external dimensions of the scene are disregarded. Instead, an environmental object such as a table or couch is used as the reference point for the scene description. As such, the SR reconstruction shows the scene with the environmental elements but without accompanying walls.

As represented by block 8-4, the method 800 includes performing a scene parsing process on the video content to synthesize a scene description. In some implementations, the scene description includes an overall mini-screenplay for the scene or an interaction sequence for each plot-effectuator in the scene (e.g., for character A: pick up cup, drink from cup, put down cup, look to character B, talk to character B, get up from chair, walk out of room). In some implementations, the SR content generator 250 or a component thereof (e.g., the scene parsing engine 414) performs the scene parsing process on the video content in order to generate a scene description. The scene parsing process is described in more detail above with reference to FIG. 4.

In some implementations, as represented by block 8-4*a*, the method 800 includes determining an action sequence for each of the plot-effectuators. In some implementations, the SR content generator 250 or a component thereof (e.g., the scene parsing engine 414) determines an action sequence for each of the plot-effectuators within the scene. For example, an action sequence associated with a first plot-effectuator for the scene includes the following temporally-ordered sequence of actions: walk in door, sit down in chair A, pick up coffee cup, drink from coffee cup, put coffee cup down, stand up, speak with second plot-effectuator, wave arms, walk around table, and walk out of door.

In some implementations, as represented by block 8-4*b*, the method 800 includes determining a trajectory for each of the plot-effectuators. In some implementations, the SR content generator 250 or a component thereof (e.g., the scene parsing engine 414) also determines a trajectory for each of the plot-effectuators within the scene. For example, a trajectory sequence associated with a first plot-effectuator within the scene includes a route or path the first plot-effectuator takes relative to the 3-dimensional map of the setting associated with the scene.

As represented by block 8-5, the method 800 includes obtaining digital assets associated with the video content. In some implementations, the digital assets are received or retrieved from a library of assets associated with the video content. In some implementations, the digital assets correspond to pre-existing video game models of the plot-effectuators in the scene (e.g., objects and/or humanoid characters). In some implementations, the digital assets correspond to pre-existing skinned point clouds of the plot-effectuators. In some implementations, the digital assets correspond to pre-existing models for the setting (e.g., the bridge of a space ship, the inside of an automobile, an apartment living room, NYC Times Square, etc.).

In some implementations, the digital assets are generated on-the-fly based at least in part on the video content and external data associated with the video content. In some implementations, the external data associated with the video content corresponds to pictures of actors, height and other measurements of actors, various views (e.g., plan, side, perspective, etc. views) of sets and objects, and/or the like.

As represented by block 8-6, the method 800 includes generating an SR reconstruction of the scene by driving the digital assets according to the scene description. In some implementations, the SR content generator 250 or a component thereof (e.g., the reconstruction engine 254) generates an SR reconstruction of the scene by driving the digital assets according to the scene description. The SR reconstruction process is described in more detail above with reference to FIG. 4.

In some implementations, generating the SR reconstruction of the scene includes instantiating a thread for each plot-effectuator. For example, each thread corresponds to a sequence of actions for each character or object in the scene. As one example, for a first plot-effectuator in the scene, the thread includes the following action sequence: the first plot-effectuator sits down at a chair, eats a meal, stands up, walks to a couch, and sits on the couch. As another example, for a vase-like object in the scene, the thread includes the following action sequence: the vase is picked up and throw into wall, vase breaks into a plurality of pieces and falls to floor.

As represented by block 8-7, the method 800 includes presenting the SR reconstruction. For example, with reference to FIG. 4, the reconstruction engine 254 provides the SR reconstruction 440 to SR presentation pipeline 450 for presentation to the user. As one example, with reference to FIGS. 1B-4, the SR reconstruction 440 is rendered by the controller 110 and transmitted to the electronic device 120 as presentation data, where the SR reconstruction 440 is presented via the one or more displays 312. For example, the user of the electronic device 120 is able to experience the SR reconstruction 440 as if he/she is in the midst of the action (e.g., a first-person experience). In another example, the user of the electronic device 120 is able to experience the SR reconstruction 440 as if he/she is looking down at the action from a birds-eye view (e.g., a third-person experience). In this example, the SR reconstruction 440 may be presented as if the SR reconstruction 440 is occurring within the physical setting 105 (e.g., a 3-dimensional projection of the video content appearing on a planar surface within the physical setting 105).

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device including non-transitory memory and one or more processors coupled with the non-transitory memory:
      identifying a plurality of plot-effectuators and a plurality of environmental elements within a scene associated with a portion of video content;
      determining one or more spatial relationships between the plurality of plot-effectuators and the plurality of environmental elements within the scene;
      synthesizing a representation of the scene based at least in part on the one or more spatial relationships;
      extracting a plurality of action sequences corresponding to the plurality of plot-effectuators based at least in part on the portion of the video content; and generating a corresponding synthesized reality (SR) reconstruction of the scene, including instantiating a plurality of threads, each corresponds to a respective one of the plurality of plot-effectuators performing respective plurality of action sequences in the scene, and driving a plurality of digital assets, associated with the plurality of plot-effectuators, within the representation of the scene according to the plurality of action sequences tracking the plurality of threads.

2. The method of claim 1, further comprising:
   generating a map of an environment associated with the scene that includes the plurality of environmental elements within the scene, wherein the synthesizing the representation of the scene includes synthesizing the representation of the scene based at least in part on the one or more spatial relationships and the map of the environment.

3. The method of claim 2, wherein the map of the environment associated with the scene corresponds to a three-dimensional map of the environment that localizes the plurality of plot-effectuators and the plurality of environmental elements within the environment associated with the scene.

4. The method of claim 1, wherein a first action sequence among the plurality of action sequences corresponds to a first plot-effectuator among the plurality of plot-effectuators, and wherein a trajectory of the first plot-effectuator within an environment is linked to the first action sequence for the first plot-effectuator.

5. The method of claim 4, wherein first action sequence includes actions performed by the first plot-effectuator within the environment.

6. The method of claim 4, wherein the first plot-effectuator corresponds to one of a humanoid, animal, vehicle, android, or robot associated with the scene.

7. The method of claim 1, wherein a first digital asset among the plurality of digital assets corresponds to a first plot-effectuator, and wherein the first digital asset corresponds to a pre-existing video game model associated with the first plot-effectuator.

8. The method of claim 1, wherein a first digital asset among the plurality of digital assets corresponds to a first plot-effectuator, and wherein the first digital asset corresponds to a pre-existing skinned point cloud associated with the first plot-effectuator.

9. The method of claim 1, further comprising:
   obtaining the plurality of digital assets from a library of digital assets associated with the video content.

10. The method of claim 1, further comprising:
   generating the plurality of digital assets on-the-fly based at least in part on the video content and external data associated with the video content.

11. A device comprising:
   one or more processors;
   a non-transitory memory; and
   one or more programs stored in the non-transitory memory, which, when executed by the one or more processors, cause the device to:
      identify a plurality of plot-effectuators and a plurality of environmental elements within a scene associated with a portion of video content;
      determine one or more spatial relationships between the plurality of plot-effectuators and the plurality of environmental elements within the scene;
      synthesize a representation of the scene based at least in part on the one or more spatial relationships;

extract a plurality of action sequences corresponding to the plurality of plot-effectuators based at least in part on the portion of the video content; and generate a corresponding synthesized reality (SR) reconstruction of the scene, including instantiating a plurality of threads, each corresponds to a respective one of the plurality of plot- effectuators performing respective plurality of action sequences in the scene, and driving a plurality of digital assets, associated with the plurality of plot-effectuators, within the representation of the scene according to the plurality of action sequences tracking the plurality of threads.

12. The device of claim 11, wherein the one or more programs further cause the device to:

generate a map of an environment associated with the scene that includes the plurality of environmental elements within the scene, wherein the synthesizing the representation of the scene includes synthesizing the representation of the scene based at least in part on the one or more spatial relationships and the map of the environment.

13. The device of claim 12, wherein the map of the environment associated with the scene corresponds to a three-dimensional map of the environment that localizes the plurality of plot-effectuators and the plurality of environmental elements within the environment associated with the scene.

14. The device of claim 11, wherein a first action sequence among the plurality of action sequences corresponds to a first plot-effectuator among the plurality of plot-effectuators, and wherein a trajectory of the first plot-effectuator within an environment is linked to the first action sequence for the first plot-effectuator.

15. The device of claim 14, wherein first action sequence includes actions performed by the first plot-effectuator within the environment.

16. The device of claim 14, wherein a first digital asset among the plurality of digital assets corresponds to the first plot-effectuator, and wherein the first digital asset corresponds to a pre-existing video game model associated with the first plot-effectuator.

17. A non-transitory memory storing one or more programs, which, when executed by one or more processors of a device, cause the device to:

identify a plurality of plot-effectuators and a plurality of environmental elements within a scene associated with a portion of video content;

determine one or more spatial relationships between the plurality of plot-effectuators and the plurality of environmental elements within the scene;

synthesize a representation of the scene based at least in part on the one or more spatial relationships;

extract a plurality of action sequences corresponding to the plurality of plot-effectuators based at least in part on the portion of the video content; and generate a corresponding synthesized reality (SR) reconstruction of the scene, including instantiating a plurality of threads, each corresponds to a respective one of the plurality of plot-effectuators performing respective plurality of action sequences in the scene, and driving a plurality of digital assets, associated with the plurality of plot-effectuators, within the representation of the scene according to the plurality of action sequences tracking the plurality of threads.

18. The non-transitory memory of claim 17, wherein the one or more programs further cause the device to:

generate a map of an environment associated with the scene that includes the plurality of environmental elements within the scene, wherein the synthesizing the representation of the scene includes synthesizing the representation of the scene based at least in part on the one or more spatial relationships and the map of an environment.

19. The non-transitory memory of claim 18, wherein the map of the environment associated with the scene corresponds to a three-dimensional map of the environment that localizes the plurality of plot-effectuators and the plurality of environmental elements within the environment associated with the scene.

20. The non-transitory memory of claim 17, wherein a first action sequence among the plurality of action sequences corresponds to a first plot-effectuator among the plurality of plot-effectuators, and wherein a trajectory of the first plot-effectuator within an environment is linked to the first action sequence for the first plot-effectuator.

21. The non-transitory memory of claim 20, wherein first action sequence includes actions performed by the first plot-effectuator within the environment.

22. The non-transitory memory of claim 21, wherein a first digital asset among the plurality of digital assets corresponds to the first plot-effectuator, and wherein the first digital asset corresponds to a pre-existing video game model associated with the first plot-effectuator.

* * * * *